(12) United States Patent
Sytny et al.

(10) Patent No.: US 12,501,128 B2
(45) Date of Patent: Dec. 16, 2025

(54) CAMERA DEVICE FOR A VEHICLE AND VEHICLE

(71) Applicant: VALEO SCHALTER UND SENSOREN GMBH, Bietigheim-Bissingen (DE)

(72) Inventors: Marek Sytny, Prague (CZ); Tomas Vesely, Prague (CZ)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 16 days.

(21) Appl. No.: 18/580,153

(22) PCT Filed: Jul. 18, 2022

(86) PCT No.: PCT/EP2022/069994
§ 371 (c)(1),
(2) Date: Jan. 18, 2024

(87) PCT Pub. No.: WO2023/001732
PCT Pub. Date: Jan. 26, 2023

(65) Prior Publication Data
US 2025/0088722 A1 Mar. 13, 2025

(30) Foreign Application Priority Data
Jul. 20, 2021 (DE) ..................... 10 2021 118 716.8

(51) Int. Cl.
*H04N 23/51* (2023.01)
*B60R 16/023* (2006.01)
(Continued)

(52) U.S. Cl.
CPC ......... *H04N 23/51* (2023.01); *B60R 16/0231* (2013.01); *H04N 23/54* (2023.01); *B60R 16/0207* (2013.01); *B60S 1/0844* (2013.01)

(58) Field of Classification Search
CPC .... H04N 23/51; H04N 23/54; B60R 16/0231; B60R 16/0207; B60S 1/0844
(Continued)

(56) References Cited

U.S. PATENT DOCUMENTS 11,856,330 B2 * 12/2023 Liu ......................... B60R 1/08
2008/0231704 A1 9/2008 Schofield et al.
(Continued)

FOREIGN PATENT DOCUMENTS

CN 110174168 A 8/2019
DE 102006040213 A1 8/2007
(Continued)

OTHER PUBLICATIONS

International Search Report issued in corresponding German Patent Application No. DE 10 2021 118 716.8 mailed Mar. 21, 2022 (5 pages).
(Continued)

*Primary Examiner* — Matthew David Kim
(74) *Attorney, Agent, or Firm* — Osha Bergman Watanabe & Burton LLP

(57) ABSTRACT

A camera device for a vehicle that includes an image module for providing image data of a surrounding of the vehicle, a printed circuit board with a processing unit for processing the image data from the imaging module, and a housing for attachment to a window of the vehicle, is disclosed. The housing accommodates the imaging module and the printed circuit board and comprises a recess. The camera device also includes an environmental sensor device arranged in the recess, a disk spring arranged between a bottom surface of the recess and the environmental sensor device, and a connecting member electronically connected to the environmental sensor device and the printed circuit board. The
(Continued)

connecting member is guided through an interior hole of the disk spring and a hole of the bottom surface of the recess.

12 Claims, 4 Drawing Sheets

(51) Int. Cl.
    *H04N 23/54*     (2023.01)
    *B60R 16/02*     (2006.01)
    *B60S 1/08*     (2006.01)
(58) Field of Classification Search
    USPC ............................................. 348/148
    See application file for complete search history.

(56) References Cited

U.S. PATENT DOCUMENTS

| | | | | |
|---|---|---|---|---|
| 2010/0133410 | A1* | 6/2010 | Gruener | B60R 11/04 |
| | | | | 248/475.1 |
| 2012/0056739 | A1* | 3/2012 | Lee | B60Q 1/441 |
| | | | | 340/479 |
| 2012/0242833 | A1* | 9/2012 | Yamaguchi | B60R 11/04 |
| | | | | 348/148 |
| 2014/0226012 | A1* | 8/2014 | Achenbach | B60R 11/04 |
| | | | | 348/148 |
| 2016/0185296 | A1* | 6/2016 | Lee | G07C 5/0866 |
| | | | | 348/148 |
| 2016/0226196 | A1* | 8/2016 | Tuenker | H01R 13/6592 |
| 2018/0170261 | A1* | 6/2018 | Kaltenmark | H04N 23/63 |
| 2018/0172966 | A1* | 6/2018 | DeMersseman | |
| | | | | B29D 11/00009 |
| 2018/0361948 | A1* | 12/2018 | Lawlor | B60R 1/12 |
| 2021/0031694 | A1* | 2/2021 | Bhaskar | B60Q 1/0088 |
| 2022/0063484 | A1* | 3/2022 | Huizen | B60Q 1/247 |
| 2022/0081034 | A1* | 3/2022 | Inoue | B62D 21/152 |
| 2022/0239817 | A1* | 7/2022 | Kasarla | B60R 11/04 |
| 2023/0421907 | A1* | 12/2023 | Wang | H04N 23/55 |

FOREIGN PATENT DOCUMENTS

| | | |
|---|---|---|
| DE | 102011103302 A1 | 12/2012 |
| EP | 1312521 A2 | 5/2003 |
| EP | 2705986 A1 | 3/2014 |
| JP | S54-156798 U | 10/1979 |
| JP | 2015-120492 A | 7/2015 |

OTHER PUBLICATIONS

International Search Report issued in corresponding International Application No. PCT/EP2022/069994 mailed Oct. 20, 2022 (3 pages).

Written Opinion issued in corresponding International Application No. PCT/EP2022/069994 mailed Oct. 20, 2022 (6 pages).

\* cited by examiner

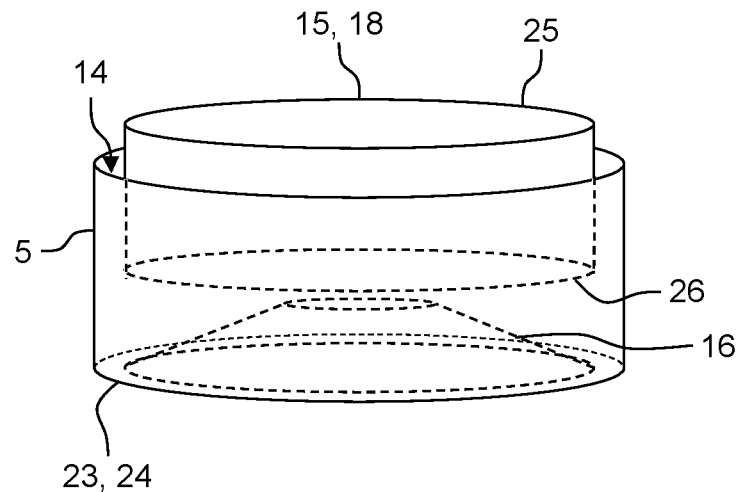
FIG. 5
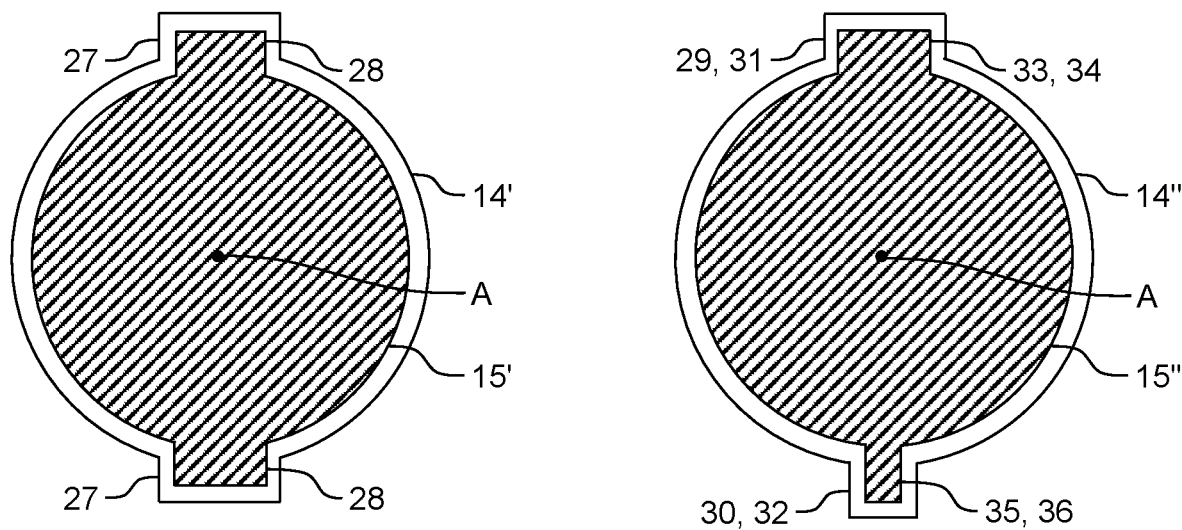
FIG. 6
FIG. 7

CAMERA DEVICE FOR A VEHICLE AND VEHICLE

The invention relates to a camera device for a vehicle and a vehicle with such a camera device.

Currently, a front camera of a vehicle and an environmental sensor, such as a rain sensor, are two separate devices which are placed in the same area on a windscreen close to the interior rear mirror. This has the disadvantage that these devices require a relatively large space and narrow the field of view of the driver. JP 2015-120492 A discloses a front camera and a rain sensor sharing a common housing and being mechanically fixed to the same board. The rain sensor of JP 2015-120492 A is accommodated in a recess of the housing and pressed against the windscreen by means of a leaf spring.

The object of the present invention is to provide an improved camera device for a vehicle.

Accordingly, a camera device for a vehicle is provided. The camera device comprises:
 an imaging module for providing image data of a surrounding of the vehicle,
 a printed circuit board with a processing unit for processing the image data from the imaging module,
 a housing for attachment to a window of the vehicle, the housing accommodating the imaging module and the printed circuit board and comprising a recess,
 an environmental sensor device arranged in the recess,
 a disk spring arranged between a bottom surface of the recess and the environmental sensor device, the disk spring being configured for pressing the environmental sensor device against the window, and
 a connecting member electronically connecting the environmental sensor device and the printed circuit board and being guided through an interior hole of the disk spring and a hole of the bottom surface of the recess.

Having the disk spring allows to apply a force to the environmental sensor device to press it against the interior side of the window of the vehicle. Thus, the environmental sensor device can be kept in a defined position with respect to the window pane even in case of vibrations during driving. Hence, a measurement accuracy of the environmental sensor (in particular rain and/or light sensor) can be improved.

Further, the disk spring allows to releasably attach the environmental sensor device to the camera device housing. Therefore, repair, maintenance and replacement of the environmental sensor device is possible without replacing the whole camera device.

By electronically connecting the environmental sensor device to the (e.g., main) printed circuit board of the camera device, the environmental sensor device can use the (e.g., main) printed circuit board of the camera device. Thus, the degree of integration of the imaging module (e.g., front camera) and the environmental sensor device is increased. Hence, the production of the camera device with the environmental sensor device is simplified. Furthermore, the imaging module and the environmental sensor device can be connected to the vehicle bus system and/or to the central electronic control unit (ECU) of the vehicle by a single interface.

Furthermore, the disk spring with its interior hole and the housing recess also having a corresponding hole allow an easy electronic connection of the environmental sensor device with the (main) printed circuit board of the camera device.

The camera device is, in particular, applied in a vehicle such as a motor vehicle. The vehicle is, for example, a passenger vehicle, a car, bus, sport utility vehicle, truck, train, watercraft and/or airplane. The camera device can also be employed in a vehicle which allows autonomous or semi-autonomous driving.

The window of the vehicle is preferably a windscreen (front window) or a back window of the vehicle. The window is, for example, made of glass. The camera device is, in particular, arranged at an interior side of the window. If the camera device is arranged at the interior side of the windscreen (front window), it is called a front camera. However, the camera device can also be arranged at a different window of the vehicle.

The camera device includes the imaging module for taking an image of the surrounding of the vehicle. Depending on the arrangement of the camera device and the imaging module in the vehicle different monitoring areas in the front, in the back and/or at the sides of the vehicle can be monitored. In particular, by using the imaging module objects at rest or moving objects can be detected, such as other vehicles, people, animals, plants, obstacles, a road unevenness (e.g., potholes or stones), lane markings, traffic signs or free spaces (e.g., parking spaces).

The imaging module of the camera device comprises, in particular, an optical system which includes, for example, an objective, a lens or the like. Further, the imaging module comprises an image sensor unit which includes, for example, a CCD camera (Charged Coupled Device) or a CMOS sensor (Complementary Metal-Oxide Semiconductor-Sensor). The imaging module is, for example, configure to take high-resolution images of the surrounding of the vehicle.

The camera device comprises the (e.g., main) printed circuit board. The (e.g., main) printed circuit board comprises the processing unit. The processing unit is, in particular, realized as an electronic component mounted on the (main) printed circuit board. The processing unit is, in particular, configured for analyzing and interpreting image data obtained by the imaging module. The processing unit includes, for example, an image processor and a storage unit.

In addition to the processing unit several other electric and/or electronic components may be arranged on the (main) printed circuit board.

The (e.g., main) printed circuit board may, for example, comprise the image sensor unit of the imaging module. In this case, the (main) printed circuit board is arranged such that it coincides (at the position of the image sensor unit) with the optical axis of the optical system of the imaging module. The image sensor unit may, in particular, be an electronic component mounted on the (main) printed circuit board. The image sensor unit is, in particular, electronically connected to a wiring pattern of the printed circuit board.

Alternatively, the camera device, in particular the imaging module, may comprise—in addition to the above described (main) printed circuit board—another printed circuit board on which the image sensor unit is arranged. In this case, the other printed circuit board having the image sensor unit is electronically connected to the (main) printed circuit board. The image sensor unit may, in particular, be an electronic component mounted on the other printed circuit board of the imaging module.

The camera device comprises, for example, a storing unit for storing image data obtained by the imaging module and/or by the environmental sensor device and other information. The storing unit may be realized by an electronic hardware component mounted on the (main) printed circuit board. The storing unit can for example be connected to the processing unit.

The environmental sensor device includes one or more sensors for detecting an environmental condition. The environmental sensor device includes, for example, one or more sensors for detecting environmental conditions outside the vehicle. Corresponding examples include a rain sensor and a light sensor. The environmental sensor device may also include, for example, one or more sensors for detecting environmental conditions inside the vehicle, in particular at the interior surface of the window to which the camera device is attached. Corresponding examples include a temperature sensor and a humidity sensor.

The above and below described units, such as the processing unit, the storing unit and a control unit (e.g. master control unit (MCU)), can each be implemented in hardware and/or software. They are preferentially implemented in hardware. In the case of a hardware implementation, the corresponding unit can be designed as a device or as part of a device, for example as a computer or as a microprocessor. For example, the device may include a central processing unit (CPU), a graphical processing unit (GPU), programmable hardware logic (e.g., a field programmable gate array, FPGA), an application-specific integrated circuit (ASIC), or the like. Further, the one or more units, such as the processing unit, the storing unit and the control unit, may be implemented together in a single hardware device, and they may share, for example, a memory, interfaces, and the like. The units, such as the processing unit, the storing unit and the control unit, may also be implemented in separate hardware devices.

According to an embodiment, the environmental sensor device includes a rain sensor, a light sensor and/or a temperature sensor.

With a rain sensor the presence of rain on the window of the vehicle can be detected and its quantity measured. Using this information, an automatic wiper function can be realized and the wipers of the vehicle controlled accordingly. For example, the wiper system can be automatically started when the windscreen is wet. Further, the scraping speed can be automatically adjusted according to the detected quantity of rain and different conditions of rainfall, splashing, etc.

The rain sensor comprises, for example, light emitting means for emitting light and light receiving means for receiving measurement light that is emitted by the light emitting means and reflected by a surface of the window. Thus, the intensity of the reflected light can be measured. When the windscreen gets wet, the amount of reflected light diminishes.

With a light sensor which has a light detection function, an automatic light system of the vehicle can be realized. For example, the headlights of the vehicle can be switched on automatically and the low and high beam controlled according to the amount of light detected. The light sensor comprises, for example, light receiving means for receiving ambient light.

A temperature sensor is an example of an environmental sensor which detects an interior condition in the vehicle, in particular at the interior surface of the window to which the camera device is attached. The measured temperature can, for example, be used to control the air condition system of the vehicle and the blower speed.

The environmental sensor device may also include a humidity sensor for measuring the humidity inside the vehicle, in particular inside the interior of the window, for using the information, for example, in an air condition system of the vehicle.

The environmental sensor device (e.g., the rain sensor) may also comprise an image detector. The image detector of the environmental sensor device may, for example, be arranged as a hardware component on an environmental sensor printed circuit board. In this case, the environmental sensor printed circuit board is electronically connected by the connecting member with the (main) printed circuit board of the camera device.

According to a further embodiment, the connecting member includes an electronic cable with connectors on both ends for connection with the environmental sensor device and the printed circuit board.

Thus, the electronic connection between the environmental sensor device and the (main) printed circuit board can be realized by a releasable connecting member. The connectors at the two ends of the electronic cable are, for example, plug-in connectors. Further, both the environmental sensor device (e.g., an environmental sensor printed circuit board) and the (main) printed circuit board of the camera device comprise, for example, corresponding connectors to be connected to the connectors of the electronic cable, respectively.

According to a further embodiment, the processing unit of the printed circuit board is configured for processing data provided by the environmental sensor device. In an alternative embodiment, the control unit of the printed circuit board is configured for processing data provided by the environmental sensor device.

By performing the sole or main processing of data from the environmental sensor device by means of the processing unit or the control unit of the (main) printed circuit board of the camera device, the configuration and production of the environmental sensor device can be simplified. In particular, the environmental sensor device and the imaging module can share the processing unit and/or control unit. Hence, the environmental sensor device does not require an own processing unit and/or control unit but can use the processing unit and/or control unit of the (main) printed circuit board.

For example, the processing unit or the control unit of the (main) printed circuit board of the camera device may analyze data from a rain sensor by measuring the intensity of reflected light from the obtained rain sensor data. Further, based on the measured intensity of reflected light, the processing unit or control unit may calculate a rain quantity and/or derive if the wipers should be switched on or a wiper speed should be changed (e.g., increased).

For example, the processing unit or control unit of the (main) printed circuit board of the camera device may analyze data from a light sensor by measuring the intensity of ambient light from the obtained light sensor data and derive based on them if head lights need to be switched on or off.

According to a further embodiment, the processing unit is configured for controlling the imaging module and the environmental sensor device.

Thus, the environmental sensor device and the imaging module can share the same processing unit. Hence, the configuration of the environmental sensor device can be simplified as the environmental sensor device does not require an own processing unit. Thus, with the proposed camera device including the integrated environmental sensor device, the number of required components can be reduced.

The control unit is, for example, a master control unit (MCU) of the camera device. The control unit is, for example, configured to control functions of the imaging module, in particular functions for taking an image and other camera settings. Further, the control unit is, for example, configured to control functions of a measurement unit (e.g., rain detection unit, light detection unit, temperature detection unit) of the environmental sensor device, in particular functions for obtaining the corresponding measurement data (e.g., intensity of reflected light, intensity of ambient light, temperature data).

According to a further embodiment, the printed circuit board comprises at least one communication interface and/or connector for transmitting data to a bus system of the vehicle and/or to an electronic control unit of the vehicle.

The communication interface and/or connector is, in particular, configured to transmit data obtained by the imaging module and processed by the processing unit as well as data obtained by the environmental sensor device and processed by the processing unit to the bus system of the vehicle and/or to the electronic control unit of the vehicle. The communication interface can in particular be connected to the control unit (e.g. Master control unit (MCU), which can be connected to the processing unit.

Thus, both the imaging module and the environmental sensor device can be electronically connected to an electronic system of the vehicle, in particular, the central electronic control unit (ECU) of the vehicle by using a single interface and/or connector. Thus, the configuration of the camera device having the environmental sensor device can be further simplified as the environmental sensor device does not require an own interface and/or connector to the electronic system of the vehicle.

For example, the printed circuit board comprises a single communication interface and/or single connector for transmitting data to the bus system of the vehicle and/or to the electronic control unit of the vehicle.

According to a further embodiment, the bottom surface of the recess has a circular shape and the environmental sensor device has a cylindrical shape with a circular base area accommodated in the recess.

In particular, a radius of the circular base area of the environmental sensor device is smaller than a radius of the circular base area of the recess in order to accommodate the environmental sensor device in the recess of the camera device housing.

According to a further embodiment, the recess comprises at least one groove and the environmental sensor device comprises at least one protrusion for engaging with the at least one groove.

By applying a groove-protrusion (groove-detent) system, the position of the environmental sensor device in the recess can be restricted to a limited number of possible positions (e.g., only one or two possible positions) with respect to a rotation around a central axis (symmetry axis) of the environmental sensor device (e.g., with respect to a symmetry axis of a cylindrically shaped environmental sensor device).

Having such a predefined position of the environmental sensor device (in particular in case of a rain sensor and/or a light sensor) allows a more precise measurement of the corresponding quantity (e.g., rain, light). In particular, the measurement unit (e.g., rain detection unit, light detection unit) of the environmental sensor device can be designed for the predefined position.

The at least one groove is, in particular, a radial groove as seen in the direction of a central axis (symmetry axis) of the (e.g. cylindrically shaped) environmental sensor device. The at least one protrusion is, in particular, a radial protrusion as seen in the direction of the central axis (symmetry axis) of the (e.g. cylindrically shaped) environmental sensor device.

According to a further embodiment, the recess comprises two identically shaped grooves and the environmental sensor device comprises two identically shaped protrusions engaging the two grooves.

Thus, the position of the environmental sensor device with respect to a rotation around its central axis (symmetry axis) can be restricted to two possible positions.

According to a further embodiment, the recess comprises at least one groove with a first shape and at least one groove with a second shape, the first shape being different from the second shape, and the environmental sensor device comprises at least one protrusion with a first shape for engagement with the groove having the first shape and at least one protrusion with a second shape for engagement with the groove having the second shape.

Thus, the position of the environmental sensor device with respect to a rotation around its central axis (symmetry axis) can be restricted to only one possible position by using two differently shaped radial protrusions (detents). Hence, the environmental sensor device can be designed for one single predefined position of the environmental sensor device. Therefore, a measurement accuracy can be further increased. For example, false reflections of a rain sensor can be better avoided.

According to a further aspect, a vehicle comprising the above described camera device is provided.

Features described in conjunction with the camera device equally apply to the vehicle according to the further aspect.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the dependent claims and the subsequent description of the embodiments.

In the following, the invention will be described in detail based on preferred embodiments with reference to the following figures.

FIG. 5 shows a perspective view of an environmental sensor device of the camera device of FIG. 2 and FIG. 3, the environmental sensor device being accommodated in a recess of a housing of the camera device;

FIG. 6 shows a top view of an environmental sensor device accommodated in a recess of the camera device housing according to a further embodiment;

FIG. 7 shows a top view of an environmental sensor device accommodated in a recess of the camera device housing according to a further embodiment.

In the figures, like reference numerals designate like or functionally equivalent elements, unless otherwise indicated.

Figure 1:
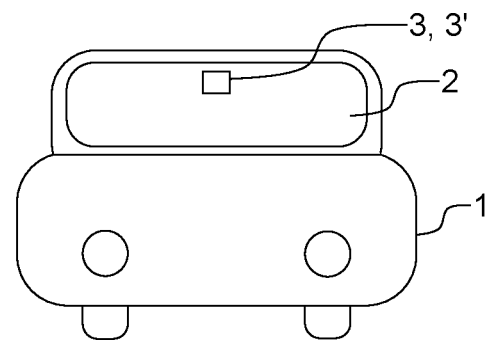
FIG. 1 shows a front view of a vehicle.

FIG. 1 shows a front view of a vehicle 1. The vehicle in this example is a passenger vehicle. In other examples, the vehicle 1 may also be a truck, bus or another motor vehicle. On an interior side of a front windscreen 2, a camera device 3 is attached to the windscreen 2. The camera device 3 is—as seen from the driver—attached behind or near a rear-view mirror (not shown) of the vehicle 1.

Figure 2:
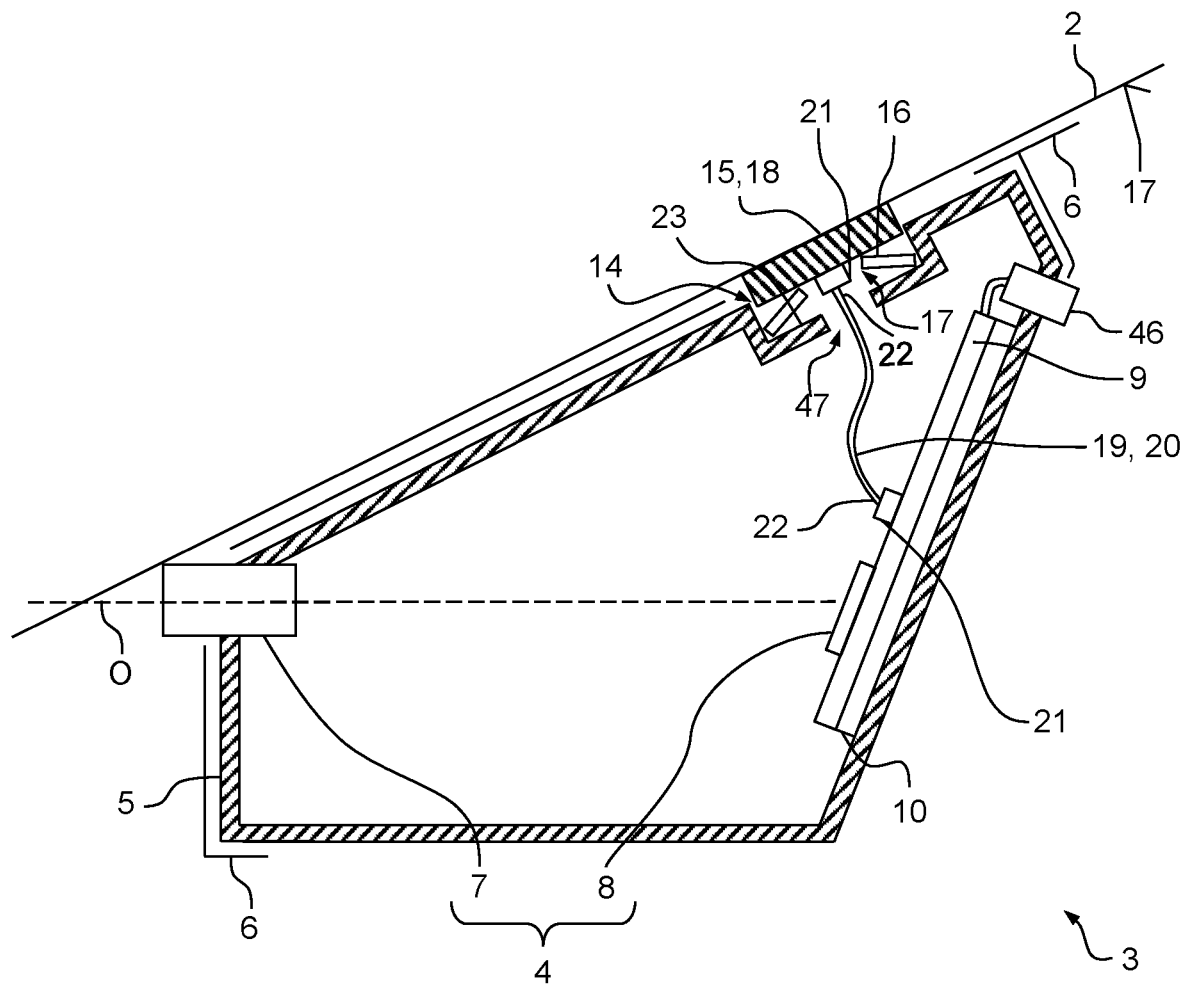
FIG. 2 shows a camera device of the vehicle of FIG. 1 according to a first embodiment.

FIG. 2 shows a cross-section view of the camera device 3 attached to the windscreen 2.

The camera device 3 includes an imaging module 4 (front camera) which is configured for monitoring an area in front of the vehicle 1. The imaging module 4 can be used for several driver assistance functions such as object detection, adaptive cruise control, lane keep assist, automatic emergency braking, automatic (emergency) steering, traffic jam assist, high beam assist, highway assist and/or traffic jam pilot. In other examples, the camera device 3 may also be attached at other windows or positions of the vehicle 1 and/or may be directed towards other directions.

The camera device 3 includes a housing 5. The camera device 3 includes further, for example, a bracket 6 for attaching (e.g., adhering) the camera device 3 at the windscreen 2.

The camera device 3 includes the imaging module 4 (front camera) accommodated in the housing 5. The imaging module 4 comprises an optical system 7 (e.g., an objective 7) protruding from the housing 5. Reference sign O denotes an optical axis of the optical system 7. Further, the imaging module 4 comprises an image sensor unit 8. The image sensor unit 8 is, for example, a CCD camera (Charged Coupled Device) or a CMOS sensor. For example, the image sensor 8 is an active pixel sensor based on CMOS technology (CMOS-APS, CMOS active pixel sensor). The imaging module 4 is, for example, configured to take high-resolution images of the surrounding of the vehicle 1.

The camera device 3 comprises a main printed circuit board 9. The main printed circuit board 9 is, for example, mechanically fixed to the housing 5 by means of a mount 10.

In the embodiment shown in FIG. 2, the image sensor unit 8 is arranged on the main printed circuit board 9. The image sensor unit 8 is, in particular, an electronic component mounted on the main printed circuit board 9.

Figure 3:
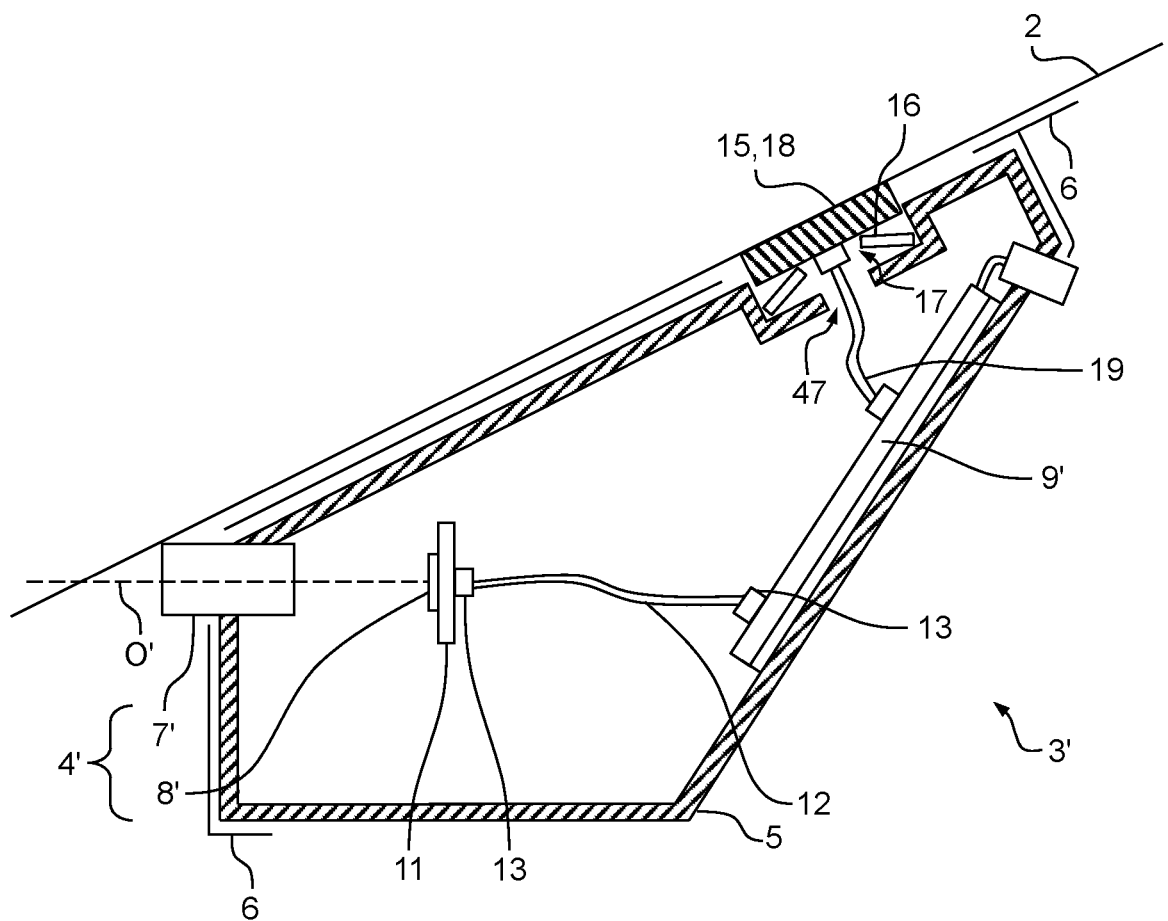
FIG. 3 shows a camera device of the vehicle of FIG. 1 according to a second embodiment.

FIG. 3 shows another embodiment of the camera device 3' of the vehicle 1. In the embodiment of FIG. 3, the image sensor unit 8' is arranged on a separate printed circuit board 11. The separate printed circuit board 11 and the main printed circuit board 9' are electronically connected, for example, by means of an electronic cable 12 and connectors 13. Apart from the separate printed circuit board 11, the camera device 3' according to the embodiment of FIG. 3 comprises the same features as the camera device 3 according to the embodiment of FIG. 2.

The optical system 7, 7' (e.g., the objective 7, 7') is, for example, mechanically attached to the housing 5 (FIGS. 2, 3) and is aligned with the main printed circuit board 9 (FIG. 2) or the separate printed circuit board 11 (FIG. 3) by means of optical alignment (not shown).

As shown in FIG. 2 (and also in FIG. 3), the housing 5 comprises a recess 14 for accommodating an environmental sensor device 15. In the shown example, the environmental sensor device 15 is a rain sensor device. The environmental sensor 15 may in other examples also include instead or in addition a light sensor, a temperature sensor and/or a humidity sensor.

Figure 4:
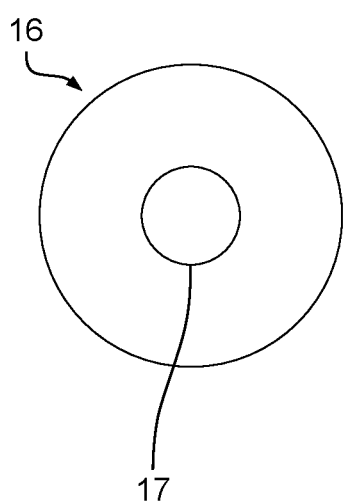
FIG. 4 shows a top view of a disk spring of the camera device of FIG. 2 and FIG. 3.

In the recess 14, a disk spring 16 is arranged for pressing the rain sensor device 15 against the interior surface 17 of the windscreen 2. FIG. 4 shows a top view of the disk spring 16. As shown in FIGS. 2 and 4, the disk spring 16 has an interior hole 17. Further, the recess 14 has a corresponding hole 47.

The rain sensor device 15 comprises a rain sensor housing 18 and an optical unit (not shown) accommodated in the rain sensor housing 18. The optical unit of the rain sensor device 15 may include light transmitting means and light receiving means (not shown). Further, the rain sensor device 15 may include an image detector 41 (only shown in FIG. 8). The image detector 41 of the rain sensor device 15 may be arranged on a rain sensor printed circuit board (environmental sensor printed circuit board) (not shown) accommodated in the rain sensor housing 18.

The rain sensor device 15, e.g., the rain sensor printed circuit board (not shown) of the rain sensor device 15, is electronically connected by means of a connecting member 19 with the main printed circuit board 9, 9' of the camera device 3, 3'. The connecting member 19 in the shown example is an electronic cable 20 having a connector 21 on each of its two ends 22. The connectors 21 are, for example, plug-in connectors for releasably connecting the electronic cable 20 to the rain sensor device 15 on one end 22 and to the main printed circuit board 9, 9' on its other end 22. The connecting member 19, i.e. the electronic cable 20, is guided through the interior hole 17 of the disk spring 16 and through the corresponding hole 47 of the recess 14 of the housing 5 of the camera device 3, 3'.

FIG. 5 shows a detailed view of the rain sensor device 15 accommodated in the recess 14 of the housing 5 of the camera device 3, 3'. In the example shown in the figures, a bottom surface 23 of the recess 14 has a circular shape 24. Further, the rain sensor device 15, i.e. its rain sensor housing 18, has a cylindrical shape 25 with a circular base area 26. A radius of the circular base area 26 of the rain sensor device 15 is smaller than a radius of the bottom surface 23 of the recess 14. The rain sensor device 15 is arranged in the recess 14 such that the circular base area 26 is accommodated in the recess 14. FIG. 5 further shows schematically the disk spring 16 arranged between the base area 26 of the rain sensor device 15 and the bottom surface 23 of the recess 14.

FIG. 6 shows an embodiment of the rain sensor device 15' and of the recess 14'. In this embodiment, the recess 14' comprises two radial grooves 27 and the rain sensor device 15' comprises two radial protrusions 28 for engaging with the two radial grooves 27. In the embodiment of FIG. 6, the two radial grooves 27 are identically shaped. Further, also the two radial protrusions 28 are identically shaped. Thus, the position of the rain sensor device 15' in the recess 14' is restricted to two possible positions with respect to a rotation around a central axis A (symmetry axis A) of the rain sensor device 15'. The two possible positions deviate from each other by a rotation around the axis A by 180°.

FIG. 7 shows a further embodiment of the rain sensor device 15" and of the recess 14". In this embodiment, the recess 14" comprises a first radial groove 29 and a second radial groove 30. The first radial groove 29 has a first shape 31 and the second radial groove 30 has a second shape 32. The first shape 31 is different from the second shape 32. Furthermore, the rain sensor device 15" comprises a first radial protrusion 33 having a first shape 34 for engagement with the first radial groove 29 of the recess 14". Further, the rain sensor device 15" comprises a second radial protrusion 35 having a second shape 36 for engagement with the second radial groove 30 of the recess 14".

Thus, in the embodiment of FIG. 7, the position of the rain sensor device 15" in the recess 14" is restricted to one single possible position with respect to a rotation around the central axis A of the rain sensor device 15". This allows to configure the optical unit (not shown) of the rain sensor device 15" for this unique position of the rain sensor device 15" with respect to the camera device housing 5, and thus, with respect to the windscreen 2. In this manner, the detection of rain on the windscreen 2 and the measurement of the quantity of rain can be performed with a higher accuracy. For example, in a measurement based on the reflection of light on a surface of the windscreen 2, false reflections can be better avoided.

Figure 8:
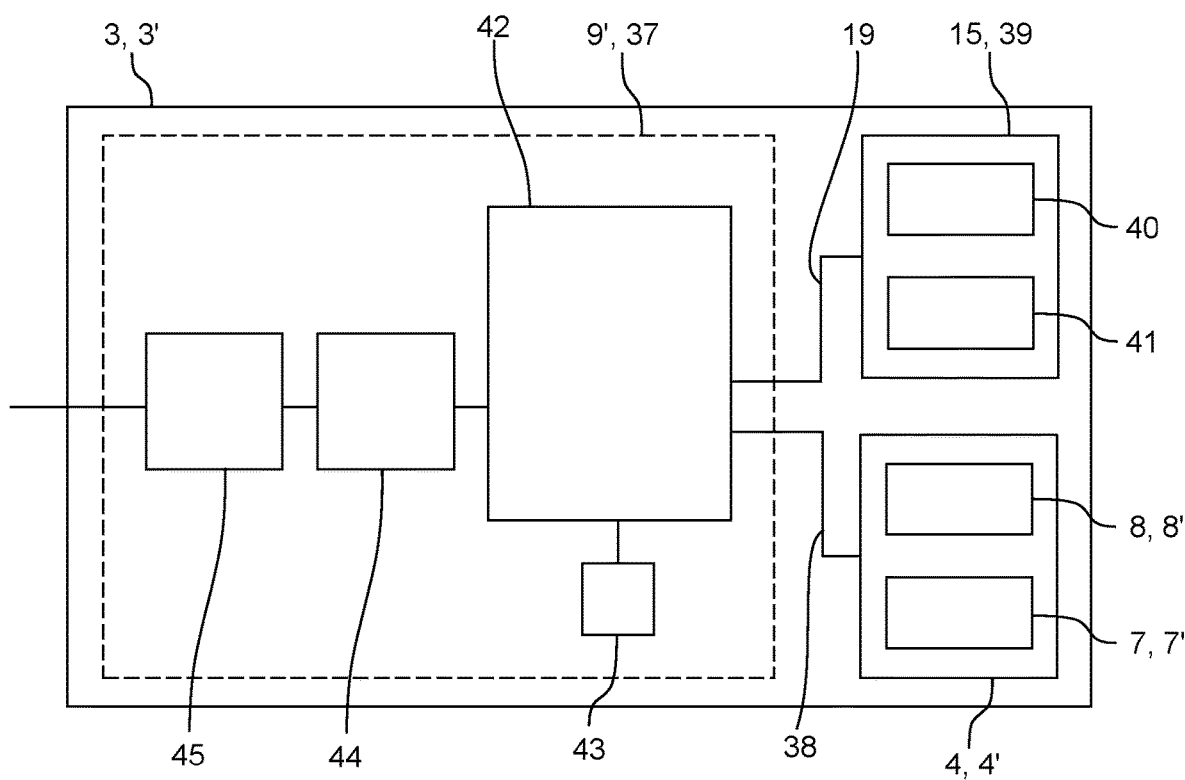
FIG. 8 shows a schematic view of functional components of the camera device of FIGS. 2 and 3.

FIG. 8 shows a schematic view of functional components of the camera device 3, 3' of FIGS. 2 and 3.

The camera device 3, 3' comprises the imaging module 4, 4' including the optical system 7, 7' and the image sensor unit 8, 8'. The camera device 3, 3' comprises a further module 37 which is electronically connected (38) to the imaging module 4, 4'. The further module 37 is mounted on the main printed circuit board 9, 9' (FIGS. 2 and 3). The image sensor unit 8, 8' may be also mounted on the main printed circuit board 9 (FIG. 2) or may be mounted on a separate printed circuit board 11 of the imaging module 4' (FIG. 3). In the case that the image sensor unit 8, 8' is also mounted on the main printed circuit board 9 (FIG. 2), the electronic connection 38 may be realized by wiring on the main printed circuit board 9, 9'. In the case that the image sensor unit 8, 8' is mounted on a separate printed circuit board 11 (FIG. 3), the electronic connection 38 is realized by the electronic cable 12 (FIG. 3).

The camera device 3, 3' comprises an environmental sensor module 39 (rain sensor module 39) corresponding to the environmental sensor device 15 (e.g., the rain sensor device 15). The rain sensor module 39 (rain sensor device 15) is electronically connected by means of the connecting element 19 (FIGS. 2 and 8) to the further module 37 (mounted on the main printed circuit board 9, 9'). The rain sensor module 39 (rain sensor device 15) includes a measurement unit 40 (e.g., an optical unit comprising for example lenses). The rain sensor module 39 (rain sensor device 15) may also include an image detector 41 mounted, for example, on a separate rain sensor printed circuit board (environmental sensor printed circuit board) (not shown) accommodated in the housing 18 of the rain sensor device 15.

The further module 37 comprises a processing unit 42, a storing unit 43, a control unit 44 (e.g. Master control unit (MCU)) and a communication interface 45. The further module 37 may also comprise further electric and/or electronic components.

The processing unit 42 is or includes, for example, a video processor for analyzing image data obtained by the imaging module 4, 4'. The processing unit 42 may also be configured for processing rain sensor data from the rain sensor device 15. Alternatively, the control unit 44 could be configured for processing data provided by the environmental sensor device 15 (not shown in the Figures).

Image data obtained by the imaging module 4, 4' and/or rain sensor data obtained by the rain sensor device 15 may be stored in the storing unit 43. In addition, also other information may be stored in the storing unit 43 such as analysis results derived (e.g., by means of the processing unit 42) from image data obtained by the imaging module 4, 4' and/or from rain sensor data obtained by the rain sensor device 15, predefined values and/or program codes. The storing unit 43 is connected to the processing unit 42.

The control unit 44 of the camera device 3, 3' is an electronic control unit configured to control the operation of the processing unit 42. The processing unit 42 can be configured for controlling the imaging module 4, 4' and the environmental sensor device 15.

As shown in FIG. 8, the further module 37 may also comprise a communication interface 45 for transmitting data to a bus system (not shown) of the vehicle 1 and/or to an electronic control unit (ECU) (not shown) of the vehicle 1. The communication interface 45 may be realized by means of a transceiver chip (not shown) and the connector 46 shown in FIG. 2. The communication interface 45 is connected to the control unit 44.

Although the present invention has been described in accordance with preferred embodiments, it is obvious for the person skilled in the art that modifications are possible in all embodiments.

REFERENCE SIGNS

1 vehicle
2 window
3, 3' camera device
4, 4' imaging module
5 housing
6 bracket
7, 7' optical system
8, 8' image sensor unit
9, 9' main printed circuit board
10 mount
11 printed circuit board
12 electronic cable
13 connector
14, 14', 14" recess
15, 15', 15" environmental sensor device
16 disk spring
17 surface
18 housing
19 connecting member
20 electronic cable
21 connector
22 end
23 bottom surface
24 circular shape
25 cylindrical shape
26 circular base area
27 groove
28 protrusion
29 groove
30 groove
31 shape
32 shape
33 protrusion
34 shape
35 protrusion
36 shape
37 further module
38 electronic connection
39 environmental sensor module (rain sensor module)
40 measurement unit
41 image detector
42 processing unit
43 storing unit
44 control unit
45 communication interface
46 connector
47 hole
A central axis
O, O' optical axis

The invention claimed is:

1. A camera device for a vehicle,
the camera device comprising:
an imaging module for providing image data of a surrounding of the vehicle;
a printed circuit board with a processing unit for processing the image data from the imaging module;
a housing for attachment to a window of the vehicle,
wherein the housing accommodates the imaging module and the printed circuit board and comprises a recess;
an environmental sensor device arranged in the recess;
a disk spring arranged between a bottom surface of the recess and the environmental sensor device,
wherein the disk spring is configured for pressing the environmental sensor device against the window; and
a connecting member electronically connecting the environmental sensor device and the printed circuit board,
wherein the connecting member is guided through an interior hole of the disk spring and a hole of the bottom surface of the recess.

2. The camera device according to claim 1,
wherein the environmental sensor device comprises a rain sensor.

3. The camera device according to claim 1,
wherein the connecting member includes an electronic cable with connectors on both ends for connection with the environmental sensor device and the printed circuit board.

4. The camera device according to claim 1,
wherein the processing unit or a control unit of the printed circuit board is configured for processing data provided by the environmental sensor device.

5. The camera device according to claim 1,
wherein the processing unit is configured for controlling the imaging module and the environmental sensor device.

6. The camera device according to claim 1,
wherein the printed circuit board comprises at least one communication interface or connector for transmitting data to a bus system of the vehicle or to an electronic control unit of the vehicle.

7. The camera device according to claim 1,
wherein the recess comprises at least one groove and the environmental sensor device comprises at least one protrusion engaging the at least one groove.

8. The camera device according to claim 1,
wherein the recess comprises two identically shaped grooves and the environmental sensor device comprises two identically shaped protrusions engaging the two grooves.

9. The camera device according to claim 1,
wherein the recess comprises at least one groove with a first groove shape and at least one groove with a second groove shape,
wherein the first groove shape is different from the second groove shape, and
wherein the environmental sensor device comprises:
at least one protrusion with a first protrusion shape that engages the groove with the first groove shape, and
at least one protrusion with a second protrusion shape that engages the groove with the second groove shape.

10. A vehicle comprising the camera device according to claim 1.

11. The camera device according to claim 1,
wherein the environmental sensor device comprises a light sensor.

12. The camera device according to claim 1,
wherein the environmental sensor device comprises a temperature sensor.

* * * * *